United States Patent [19]

Eiermann et al.

[11] Patent Number: 4,798,917
[45] Date of Patent: Jan. 17, 1989

[54] KIT FOR PRODUCING FIREPROOF CABLE DUCTS

[75] Inventors: Horst W. Eiermann, Basel, Switzerland; Christian Mühl, Nördl. Münchner Strasse 15B, D-8022 Grünwald, Fed. Rep. of Germany

[73] Assignees: PCT Pyrochemtek AG, Switzerland; Chemische Fabrik Grunau GmbH; Christian Mühl, both of Fed. Rep. of Germany

[21] Appl. No.: 926,364

[22] Filed: Oct. 31, 1986

[30] Foreign Application Priority Data

Oct. 31, 1985 [DE] Fed. Rep. of Germany ....... 3538844

[51] Int. Cl.$^4$ ................................................. H02G 3/04
[52] U.S. Cl. .................................... 174/72 R; 138/149; 138/158; 169/48; 174/101
[58] Field of Search ................ 174/16 R, 48, 49, 68 C, 174/70 C, 72 R, 72 C, 95–98, 101, 121 A; 428/920, 921; 52/220; 138/92, 149, 157–161, 163; 248/49, 58, 68.1; 169/48

[56] References Cited

U.S. PATENT DOCUMENTS

| 3,642,531 | 2/1972 | Peterson | 428/921 X |
| 4,223,175 | 9/1980 | Crew et al. | 174/48 X |
| 4,433,732 | 2/1984 | Licht et al. | 138/92 X |
| 4,438,785 | 3/1984 | Morrison et al. | 138/149 X |
| 4,584,214 | 4/1986 | Eiermann | 174/121 A X |

FOREIGN PATENT DOCUMENTS

| 257888 | 2/1967 | Austria | 52/220 |
| 2839396 | 3/1980 | Fed. Rep. of Germany | . |
| 3235006 | 3/1984 | Fed. Rep. of Germany | . |
| 8509123 | 7/1985 | Fed. Rep. of Germany | . |
| 546567 | 8/1922 | France | 138/157 |
| 785710 | 5/1935 | France | 138/157 |
| 576636 | 10/1977 | U.S.S.R. | 174/68 C |

Primary Examiner—Laramie E. Askin
Attorney, Agent, or Firm—Steele, Gould & Fried

[57] ABSTRACT

A kit, which is particularly intended for the fireproof laying of cables and ducts, has endwise connectable, self-supporting components made from thermally insulating material and substantially elongated metal reinforcements. The self-supporting components are duct sections (4 to 12), which in each case comprise a trough section (4' to 12') made from thermally insulating material and externally reinforced by longitudinally continuous sheet metal parts (16) and which has a substantially U-shaped cross-section, and a cover (4" to 12") also made from a thermally insulating material. The trough sections (4' to 12') being in each case equipped for the cover-less laying of the duct (1), are connectable with adjacent trough sections (4' to 12'); and the associated covers (4" to 12") are detachably fixable.

23 Claims, 3 Drawing Sheets

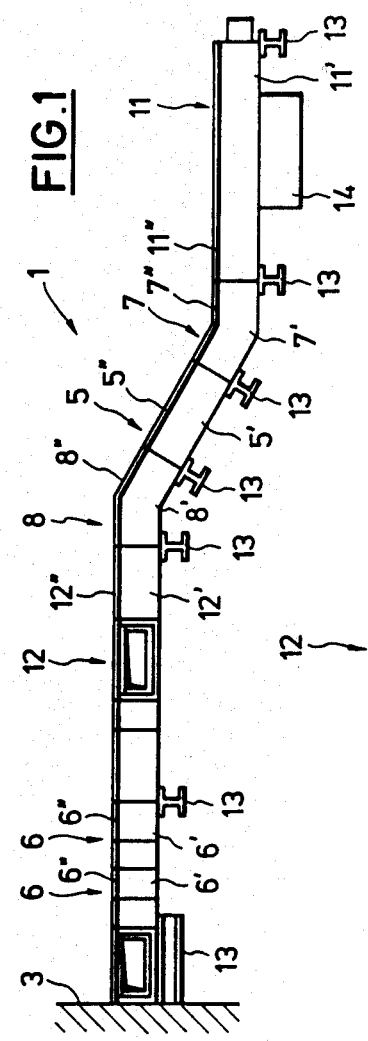

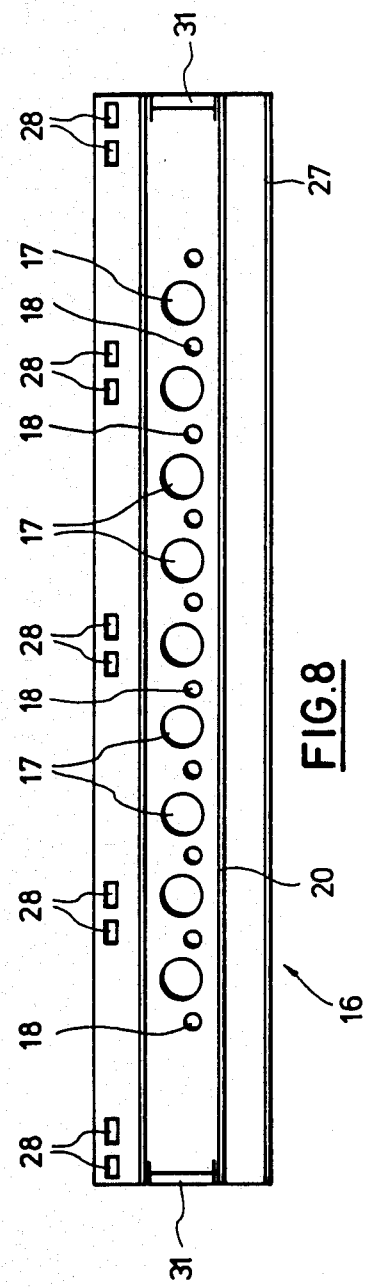
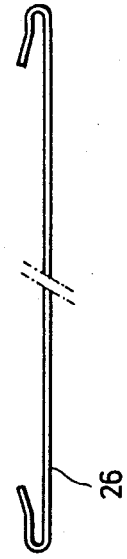
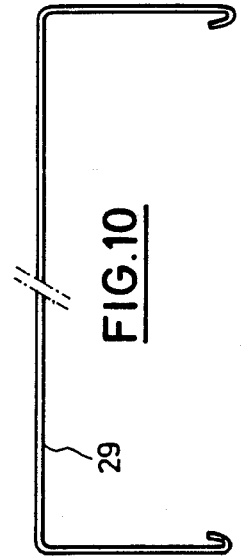
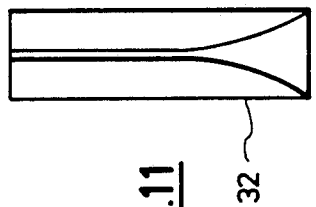

KIT FOR PRODUCING FIREPROOF CABLE DUCTS

The invention relates to a kit for producing fireproof cable ducts for new cables and lines to be laid, with endwise connectable, self-supporting components made from thermally insulating material and substantially elongated metal reinforcements associated therewith.

For insulation reasons, most cables and lines now have a plastic jacket. As the plastics generally used in the production of such cable jackets are, for cost reasons, heat sensitive, easily flammable and, in the case of a fire, harmful plastics materials, various proposals have been made with the aim of preventing cable fires. Thus, for example, it has been proposed to apply to the cables and lines a self-quenching fireproofing material, such as is e.g. disclosed in U.S. Pat. No. 3,642,531. This process is relatively complicated, particularly in those cases where several juxtaposed cables and/or lines are to be protected against the risk of fire. In addition, this only makes it possible for functioning to continue during a fire for a relatively short time.

A fireproof jacket has already been developed (cf. U.S. Pat. No. 4,584,214) which comprises rigid mineral wool components provided at least on the outside with a fireproof coating. This subsequent fireproof jacket offers an adequate protection against cable fires and enables functioning to continue during a fire. However, as a result of the numerous routes already existing, its production is relatively complicated and requires numerous components and trained personnel, whose activities must be coordinated with the person laying the cable and line, i.e. the electrician, which is often difficult or impossible to realize in practice.

An object of the present invention is to provide a cable bearing and distribution system which is in any case necessary for guiding and distributing new cables and lines to be laid and which is additionally provided with fireproofing characteristics. In the case of a fire, it enables operation to continue for a certain time, whilst it is also simple and problem-free to produce.

According to the invention this object is attained by a kit of the aforementioned type which has prefabricated, standardized, self-supporting duct sections in each case comprising a thermally insulating material trough section externally reinforced by longitudinally continuous and preferably partly bent sheet metal parts having a substantially U-shaped cross-section, and a cover associated therewith which is also made from thermally insulating material, the trough sections being in each case equipped for the cover-less laying of the duct and connectable with adjacent trough sections, the associated covers being detachably fixable.

The fireproof jacket known from U.S. Pat. No. 4,584,214 requires a longitudinally directed support structure, or only following the laying of the cable or line does the engaging of the cover and the following fitting of the longitudinally extended metal reinforcements permit a stable cable duct. However, the cable duct which can be produced with the kit according to the invention has individual, finished duct sections which can be endwise connected to give a stable duct before laying the cable and engaging the associated cover; and the cables and lines can be laid without difficulty therein. It is particularly advantageous that for laying the individual prefabricated duct sections and their endwise connection, there is no need for trained personnel, so that this work can be carried out by the persons actually laying the cables and ducts without requiring further components for guidance purposes.

The individual straight duct sections preferably in each case have a standard length of 80 to 120 cm, particularly 90 cm, whereby they only have to be supported in the vicinity of their junctions by cross-arms, which are preferably in the form of I-beams. These cross-arms can either be fixed on one side to a wall or the like, or can be suspended on one or both sides on vertically directed struts, which are in turn fixed to a room ceiling or the like. The cable duct kit according to the invention is particularly suitable for laying suspended ducts in false ceiling areas.

The covers for the duct sections are preferably substantially planar, which inter alia offers the advantage that they can be stacked in space-saving manner during cable laying, which often lasts several months, and in the case of only a limited overall height, can be placed between the previously laid duct and installations of other types located above it. A subsequent opening and re-closing, e.g. for subsequent fitting or installation purposes of the duct, is also readily possible.

The sheet metal parts, which are preferably in the form of sections provided for reinforcing and joining the individual duct sections, preferably extend over only part of the duct section circumference, particularly of the outer walls of the trough sections, so that in the case of adequate stability, the weight of the individual duct sections is not unnecessarily increased by the sheet metal parts. The sheet metal parts are advantageously made from high-grade steel.

Preferably, at particular reciprocal distances from one another, the sheet metal parts of the straight duct sections are provided with openings for the lateral leading out of the cable and lines from the duct; and the sheet metal parts of all the duct sections are provided at certain reciprocal spacings with openings for the engagement of cover fastening clasps engaging over the particular covers. Preferably, there are two lateral sheet metal parts arranged in mirror-inverted manner for each duct section. The openings provided in the sheet metal parts for leading out the cables and lines make it possible to readily drill the duct side wall for leading out individual cables and lines, but the resulting duct opening is protected around its edge, so that it is not unnecessarily widened, e.g. due to the drawing of the individual cables or lines from the duct.

The sheet metal parts preferably run along the upper and lower longitudinal edges of each trough section and in particular at least partly engage around the upper edge of the trough section, in that they are e.g. hung over it, so that they not only laterally protect the trough section but simultaneously constitute a reliable edge protection for the upper edge of the trough section and prevent said edge from being damaged during the laying of the cables and lines and during other installation work.

The sheet metal parts can be screwed to the particular trough section. For avoiding thermal bridges by fastening elements penetrating the trough sections, it is advantageously possible to use lower retaining clasps engaging below the cable duct for fixing thereof and by means of which the sheet metal parts are preferably held under initial tension against the duct walls of the trough sections. The sheet metal parts are preferably provided with longitudinal ribs engaging behind the lower retaining clasps and which are in particular aligned with the underside of the particular trough section. The lower retaining clasps can be sufficiently wide that they simultaneously engage behind adjacent sheet metal parts connected to the longitudinal ribs.

The number of the cables and lines in a duct decreases with the distance from the central supply point due to the passing out of cables and lines. It is therefore possible to provide duct sections of different widths and preferably the same height and use reducing sections for connecting the same, whereby the latter are preferably asymmetrical, which leads to the advantage that they can be fitted in space-saving manner.

According to a preferred embodiment, the sheet metal parts terminate in flush manner with the end outer wall of the trough sections, connecting members being provided for the connection of the latter. These connecting members preferably comprise on the one hand flanged portions of the sheet metal parts and on the other hand screwless clamping clasp means, particularly those by means of which it is possible to join trough sections with the advantage that on the one hand the duct sections or their trough sections have no projecting parts, which could be damaged during transportation or laying, and on the other hand that tool-less plug connections can be produced.

For increasing their fireproofing action, the trough sections, and preferably the covers associated therewith, are constructed in such a way that they can be endwise telescoped in overlapping manner, and for this purpose their ends are preferably correspondingly displaced in stepped manner. This can easily be achieved by multilayer construction. To bring about an endwise step arrangement, two layers can be displaced by an amount preferably corresponding to 50 to 100 mm and in particular approximately 60 mm. For the endwise connection and sealing of adjacent duct sections, advantageously a heat-resistant cement expanding under heat action is provided.

The individual duct sections, i.e. the individual trough sections and preferably also the covers associated therewith, are preferably made from correspondingly profiled mineral wool mouldings, which are preferably coated with a fire proofing material; i.e. the preferably one-part channel-like layers of the duct sections preferably comprise a material which is shaped and strengthened by moulding mineral wool with synthetic resin and setting the latter. This felt-like, but brittle, material is sawable and cuttable and, if necessary, makes it possible to anchor screws and fastening pins in troublefree manner.

The upper edges of the individual trough sections, whose profile preferably corresponds to a flat U, preferably have an inner shoulder for the engagement of the cover associated therewith, said cover being preferably provided on its underside with an undercut wall, and the cover outer edge can be placed on the upper edge of the trough section side wall, so that a reliable fireproof cover seal is provided.

For the construction of a cable duct of a particular width, the kit according to the invention preferably only has five different duct sections, namely straight extensions sections, angular sections leading upwards, angular sections leading downwards, sections leading to the side and random straight sections which can be vertically cut to length. If desired, these basic duct sections can be supplemented on the site by the following additional duct sections: straight sections for forming a T or cross-branch, straight tapering sections, straight widening sections and straight terminal box sections, ventilation sections and/or distribution sections.

If duct ventilation is desired, then at least one of the aforementioned straight sections, preferably a straight extension section, is provided with a cover, which has a sealable ventilation unit.

For forming fireproof clamping points, one of the aforementioned duct sections has a bottom opening, through which can be introduced from above a terminal box housing made from fireproof material, whose wall preferably opens in the bottom region. The terminal box housing is preferably constructed in one piece with the optionally present inner layer of the trough section.

The terminal box housing can have a removable bottom cover. In its interior can be provided a terminal box preferably formed from a cross-sectionally trapezoidally profiled metal sheet in which are fixed terminal strips which are accessible after removing the bottom cover.

For stability reasons, the terminal box housing is preferably made from a stronger material than the duct section carrying it. It is preferably made from silicate plates or other non-flammable, fireproof plate materials. It can also comprise the same resin-bonded plate material as the duct sections, but only if they are more highly compacted.

The end connecting faces of the individual duct sections, apart from an optionally provided stepwise displacement, preferably run at right angles to the adjacent bottom surface and preferably at right angles to the adjacent lateral face of the duct sections. The latter also applies with respect to adapters, which can be provided for joining individual duct sections, and more detailed reference will be made thereto hereinafter.

BRIEF DESCRIPTION OF THE DRAWINGS

Further details, features and advantages of the invention can be gathered from the following description of non-limitative embodiments and with reference to the attached drawings, wherein is shown:

FIG. 1, a side view of a cable duct constructed with the aid of a kit according to the invention.

FIG. 2, a plan view of the cable duct shown in FIG. 1.

FIG. 8, a side view of a sheet metal part.

FIG. 9, a lower retaining clasp.

FIG. 10, a cover fastening clasp.

FIG. 11, a side view of a screwless clamping clasp.

DETAILED DESCRIPTION OF THE PREFERRED EMBODIMENTS

Figure 3:
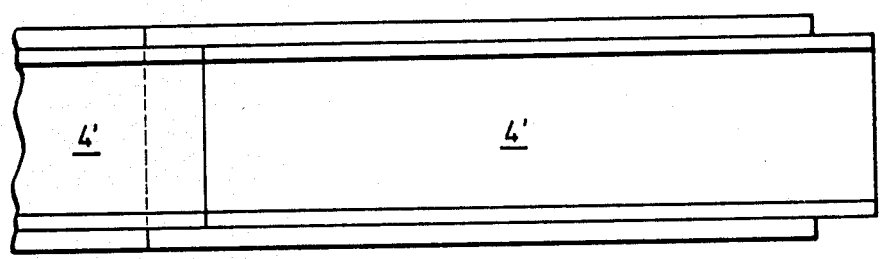
FIG. 3, a partial view of two straight extension sections without the associated covers.

The cable duct 1 shown in FIGS. 1 and 2 is laid along two walls 2, 3 at right angles to one another and on two central parts 24 and comprises several endwise, telescoped, prefabricated duct sections, namely two straight duct sections 4, a straight duct section for forming a T or cross branch 12, an upwardly leading angular section 7, a downwardly leading angular section 8, two angular sections 6 leading to the side, a random straight section 5 which can be vertically cut to length, a straight tapering section 10, a straight widening section 9, a straight terminal box section 11 and a ventilation unit 15 incorporated into a cover 4" and resting in its connecting zone on cross-arms 13 secured on one side.

The individual duct sections 4 to 12 in each case comprise a trough section 4' to 12', whose cross-section substantially corresponds to a flat U, and a substantially planar cover 4" to 12" resting thereon, the trough sections 4' to 12' in each case having an inner shoulder on which rests the underside of the cover. A terminal box housing 14 is incorporated into the terminal box section 11.

The cover 4" is provided, in the case of an otherwise identical duct section 4, with a closable or sealable ventilation unit 15, such as is e.g. known from U.S. Pat. No. 4,584,214. The trough sections 4' to 12' are constructed in double-layer form (FIG. 6), the inner layer being lower than the outer layer, accompanied by the formation of the aforementioned inner shoulder.

Figure 5A:
FIG. 5a, an integral cover cross-section.
Figure 5B:
FIG. 5b, a cover cross-section in two connected layers.

Covers 4" to 12" can be constructed in single-layer form (FIG. 5A) or double-layer form (FIG. 5B).

The individual duct sections 4 to 12 in each case having a trough section 4' to 12' and a cover 4" to 12" in each case have at least one positive and one negative end, the positive duct section ends being constructed and dimensioned in such a way that they can be inserted with a limited clearance into the negative duct section ends. In the case of a double-layer construction of the duct sections 4 to 12 or the trough sections 4' to 12' and the associated covers 4" to 12", this means that their two layers are in each case of the same length, but are reciprocally displaced whilst forming endwise steps and are interconnected, particularly by bonding.

Figure 6:
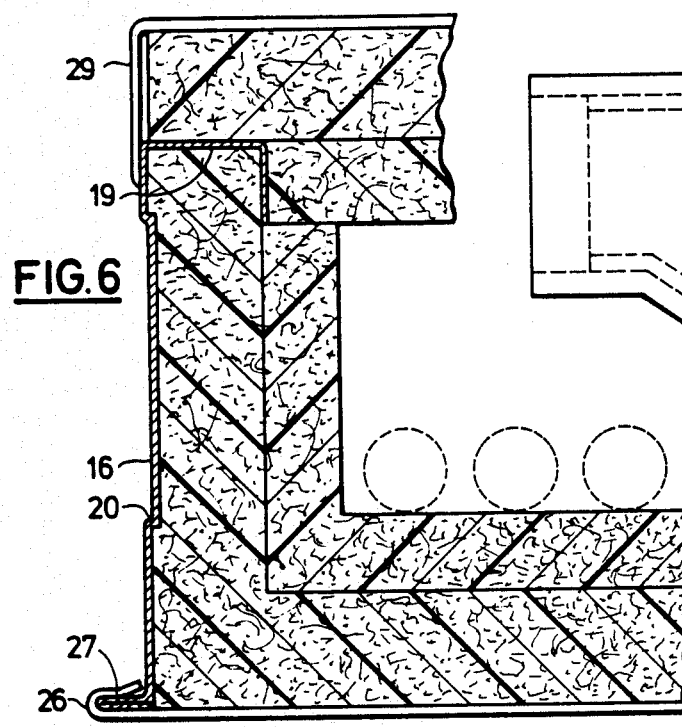
FIG. 6, a transversely sectioned partial view of a cable duct section.

On the longitudinal sides, the individual trough sections 4' to 12' are externally reinforced by a continuous profiled sheet metal part 16 and, in the case of the sheet metal parts of channels 4, 11 and 12, are provided at certain distances from one another with larger openings 17, 18 for laterally leading out cables and lines from the duct interior, whilst at certain distances from one another all the sheet metal parts have openings 28 for the engagement of cover fastening clasps 29 engaging over the covers. For each trough section, two lateral sheet metal parts 16, preferably made from high-grade steel, are arranged in mirror-inverted manner to one another and at least partly embrace the upper edge 19 (FIG. 6). The length of the two sheet metal parts 16 corresponds to the associated trough section, so that the two sheet metal parts terminate flush with the end outer wall of the particular trough section. For joining the sheet metal parts of all adjacent trough sections, which sheet metal parts preferably have rectangular flanged portions 31, connecting members in the form of screwless clamping clasps 32 are provided (FIG. 11), which are engaged from above on the flanged portions, together with lower retaining clasps 26 (FIG. 9). The screwless clamping clasps 32 are shaped sheet metal parts and comprise a substantially rectangular sheet metal part whose longitudinal edges are initially bent upwards and then against one another, a narrow gap forming between the longitudinal edges bent against one another, and said gap has a one-sided funnel-shaped extension, pointing downwards in FIG. 11. The lower retaining clasps 26 engaging below the cable duct can also be used for fixing purposes, if they are laterally displaced in such a way that they simultaneously act on two adjacent duct sections in the transition region thereof. For joining the optionally cut-to-length sheet metal parts of the straight duct sections 5, vertically cut-to-length as desired, are provided screw-on cover plates having on one end face flanged portions correspoonding to the flanged portions 31 of sheet metal parts.

All the lateral sheet metal parts 16 have a profiling 20 parallel to duct 1 for reinforcing and pretensioning the lower retaining clasps 26. The lateral sheet metal parts, particularly those of the straight duct sections 4, can have prestamped branch openings of preferably different widths for forming T or cross-parts.

The following procedure is preferably adopted for constructing a cable duct from individual parts of the kit according to the invention. It is firstly established how and at which height the finished duct is to run. When this has taken place, firstly the cross-arms 13 are fitted which will subsequently carry the finished duct. The spacings of said cross-arms 13 are preferably chosen in such a way that the connecting points of the individual duct sections are located in the vicinity of a cross-arm. After removing the associated covers 4" to 12', the prefabricated trough sections 4' to 12', on which the sheet metal parts 16 are already fitted and provided with fire proof coatings, are laid and telescoped endwise. When this has taken place, the sheet metal parts 16 of the individual trough sections are interconnected by means of the flanged portions 31 and screwless clamping clasps 32, which gives a stable trough, in which the individual cables can be laid without difficulty. To ensure that the two-sided sheet metal parts 16 always engage tightly on the outer wall of the trough sections 4' to 12', lower retaining clasps 26 engage behind the sheet metal part 16 on the longitudinal ribs 27 provided, the latter being aligned with the underside of the trough sections 4' to 12'. After interconnecting two adjacent trough sections 4' to 12' on both sides by means of in each case one screwless clamping clasp 32, one of the lower retaining clasps 26, preferably engaging under pretension, can be laterally moved to such an extent that it covers the transition between two adjacent sheet metal parts 16 or between the longitudinal ribs 27, following the prior sealing of the gaps with the fire-proof cement. Without risk of damage, the duct can be left in this state during cable laying and installation.

When the cables have been laid, the cable duct can be closed by engaging and endwise telescoping of covers 4" to 12". It is possible to ensure, by cover fastening clasps 29 (FIG. 10) cooperating with recesses 28 in the upper area of the lateral sheet metal parts 16 and engaging over covers 4" to 12", that the latter always tightly engage on their trough sections 4' to 12'.

Figure 4:
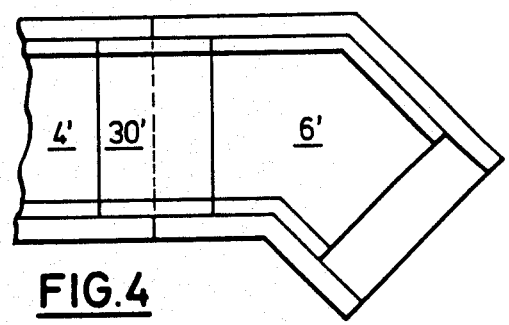
FIG. 4, a partial view of an angular section and a straight extension section connected thereto without the associated covers.

The individual duct sections 4 to 12, i.e. both their trough sections 4' to 12' and their covers 4" to 12", have in each case a positive and a negative end, a positive end of one duct section being in each case inserted in the negative end of the adjacent duct section. If in the case of duct construction two duct sections to be interconnected are arranged in such a way that their negative ends (or positive ends) face one another, the kit according to the invention has adapters forming a transition between the inner layers (or outer layers) of the adjacent duct sections. In the embodiment shown in FIG. 4 an adapter 30' is provided forming a transition between the inner layers of adjacent duct sections.

Figure 7:
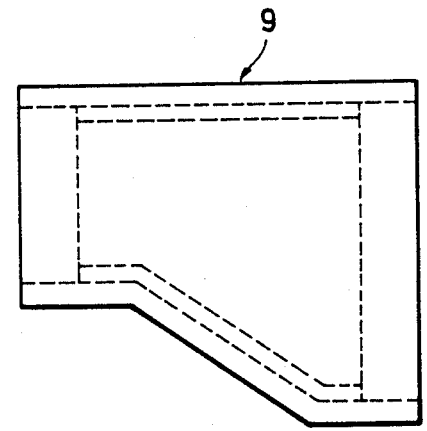
FIG. 7, a plan view of a reducing section.

The angular pieces preferably have angles of in each case 120° or 135°, so that it is possible to achieve with two or three angular pieces an angle of 90° without any sharp bend to the cable. Duct sections of different widths and the same height of 16 cm are provided. The outer width of the trough sections (without lower retaining clasps 26 and longitudinal ribs 27) is, as a function of the duct width 18, 28, 38, 48, 58 or 68 cm. The internal width is in each case approximately 8 cm smaller, because the wall thickness of the two layers of the trough sections is in each case approximately 2 cm. The reducing section 9 shown in FIG. 7 is also provided with different widths and the same height and widens or narrows by in each case one width step of 10 cm.

We claim:

1. A kit for producing a fireproof cable duct (1) from a plurality of parts, comprising:

a plurality of endwise connectable, self-supporting duct sections (4 to 12) made from thermally insulating material with substantially elongated reinforcements, the duct sections being prefabricated, and self-supporting when attached together, the duct sections (4 to 12) in each case having a trough section (4' to 12') made from thermally insulating material, the reinforcements externally reinforcing the trough sections and comprising longitudinally continuous sheet metal parts (16), the trough sections having a substantially U-shaped cross-section, and covers (4" to 12") fittable on the trough sections, the covers being made from thermally insulating material, the trough sections (4' to 12') being assemblable without the covers for cover-less laying of the duct (1) by connection of adjacent trough sections (4' to 12'), and the covers (4" to 12") being detachably fixable to the trough sections, some of the duct sections being of different cross-sectional widths, and certain of the duct sections having widening and narrowing cross-sections for attachment thereto.

2. The kit according to claim 1, wherein the duct sections (4,5,11,12) in each case have end faces perpendicular to a longitudinal extension thereof.

3. The kit according to claim 1, wherein the covers (4" to 12") are substantially planar.

4. The kit according to claim 1, wherein the sheet metal parts (16) are constructed as profiled parts and only extend over a portion of a circumference of the duct sections, on lateral outer walls of the trough sections (4' to 12').

5. The kit according to claim 4, wherein the sheet metal parts have protruding profiled parts.

6. The kit according to claim 1, wherein the sheet metal parts (16) of the duct sections (4, 11 and 12) define spaced openings (17, 18) for laterally leading cables and lines into and out of the cable duct (1), two lateral sheet metal parts (16) being arranged in mirror-inverted manner to one another for each duct section, the trough sections being solid behind the spaced openings until opened to receive said cables and lines.

7. The kit of claim 1, further comprising cover fastening clasps (29), the sheet metal parts of all the duct sections (4 to 12) having spaced openings (28) for engaging the cover fastening clasps (29) to thereby fix the covers (4" to 12") to the trough sections.

8. The kit according to claim 1, wherein the sheet metal parts (16) extend along upper and lower longitudinal edges of the trough sections (4' to 12') and at least partly embrace the upper longitudinal edges of the trough sections.

9. The kit according to claim 1, further comprising lower retaining clasps (26) for engaging the duct sections (4 to 12), and wherein the sheet metal parts (16) are held against walls of the trough sections, and the sheet metal parts (16) have longitudinal ribs (27) behind which the lower retaining clasps (26) are engagable.

10. The kit according to claim 1, wherein the sheet metal parts (16) terminate flush with end outer walls of the trough sections (4' to 12'), and further comprising connecting members (32) for engaging successive trough sections for joining said trough sections and rendering the duct self-supporting, the sheet metal parts having means for engagement with the connecting members, the connecting members being screwless clamping clasps.

11. The kit according to claim 1, wherein at least one of the trough sections (4' to 12') and the covers (4" to 12") fittable thereon are endwise telescopable in overlapping manner and end faces of the at least one of the trough sections and the covers define an inter-engaging stepped structure.

12. The kit according to claim 1, wherein at least one of the trough sections (4' to 12') and the covers (4" to 12") are formed of correspondingly profiled mineral wool molded parts, which are coated with a fireproof material.

13. The kit according to claim 12, wherein the covers (4" to 12") fittable on the trough sections (4' to 12') are provided on an underside thereof with an undercut wall and are adapted to complement the upper edges of the trough sections, at an outer edge of the cover resting on an upper edge (19) of a side wall of a trough section.

14. The kit according to claim 1, wherein upper edges (19) of the trough sections (4' to 12') have a stepped inner shoulder for supporting the covers (4" to 12").

15. The kit according to claim 1, wherein at least one of the trough sections (4' to 12') and the covers (4" to 12") fittable thereon are constructed in at least two layers.

16. The kit according to claim 15, wherein the at least two layers of the trough sections (4' to 12') are longitudinally displaced at their ends, defining male and female steps for engaging between successive trough sections.

17. The kit according to claim 16, wherein the at least two layers are displaced by a distance of 50 to 100 mm.

18. The kit according to claim 1, wherein said duct sections include straight extension sections (4), upwardly leading angular sections (7), downwardly leading angular sections (8), angular sections (6), leading to one side, straight sections, cross-branch sections, straight tapering sections (10), straight widening sections (9), straight terminal box sections (11), ventilation sections and distribution sections.

19. The kit according to claim 18, further comprising at least one straight extension section (4) with a cover (4"), which has a sealable ventilation unit (15).

20. The kit according to claim 1, further comprising a terminal box section (11) having a bottom opening and, adjacent the bottom opening, the terminal box section having a terminal box housing (14) made from fireproof material, the terminal box housing having a wall openable at the bottom opening.

21. The kit according to claim 20, wherein the trough section of the terminal box section has an inner layer and an outer layer and the terminal box housing (14) and a terminal box therefor can be inserted from above through the bottom opening of the terminal box section (11), the terminal box being carried in the terminal box section, the terminal box housing (14) being constructed in one piece with an inner layer of the trough section of the terminal box section.

22. The kit according to claim 20 or 21, wherein the terminal box housing (14) is made from a stronger material than the terminal box section and is made from non-flammable material.

23. A kit for producing fireproof cable ducts for cables and lines, comprising:
- a plurality of prefabricated, self-supporting duct sections having trough sections made from thermally insulating material and longitudinally continuous sheet metal parts externally reinforcing the trough sections, the trough sections having a substantially U-shaped cross-section, the trough sections being endwise connectable and self-supporting when connected;
- covers fittable on the trough sections, the covers also being made from thermally insulating material, the trough sections being self-supporting when connected apart from said covers; and
- a plurality of cross-arms for supporting the trough sections in a vicinity of points of connection between end connecting faces of successive trough sections, the end connecting faces of the trough sections being perpendicular to adjacent bottom surfaces of the trough sections.

* * * * *